United States Patent
Mukherjee et al.

(10) Patent No.: US 8,086,821 B2
(45) Date of Patent: *Dec. 27, 2011

(54) INPUT-OUTPUT MEMORY MANAGEMENT UNIT (IOMMU) AND METHOD FOR TRACKING MEMORY PAGES DURING VIRTUAL-MACHINE MIGRATION

(75) Inventors: Shrijeet Mukherjee, Fremont, CA (US); Scott Johnson, Cupertino, CA (US); Michael Galles, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,114

(22) Filed: Jan. 6, 2011

(65) Prior Publication Data
US 2011/0099319 A1    Apr. 28, 2011

Related U.S. Application Data

(63) Continuation of application No. 11/933,790, filed on Nov. 1, 2007, now Pat. No. 7,904,692.

(51) Int. Cl.
*G06F 9/26* (2006.01)
(52) U.S. Cl. ........................................ 711/203
(58) Field of Classification Search .................... 711/203
See application file for complete search history.

(56) References Cited

U.S. PATENT DOCUMENTS

| | | | |
|---|---|---|---|
| 6,591,349 B1 | 7/2003 | Steinman et al. | |
| 6,681,293 B1 | 1/2004 | Solomon et al. | |
| 7,454,552 B2 | 11/2008 | Stewart et al. | |
| 7,574,537 B2 * | 8/2009 | Arndt et al. | 710/36 |
| 2006/0251072 A1 | 11/2006 | Hendel et al. | |
| 2007/0038799 A1 * | 2/2007 | Hummel et al. | 711/3 |
| 2007/0038840 A1 | 2/2007 | Hummel et al. | |
| 2007/0061549 A1 | 3/2007 | Kaniyur et al. | |
| 2008/0114916 A1 | 5/2008 | Hummel et al. | |

(Continued)

FOREIGN PATENT DOCUMENTS
WO    WO-2010117360 A1    10/2010

OTHER PUBLICATIONS

U.S. Appl. No. 11/933,790, Notice of Allowance mailed Oct. 22, 2010, 7 pgs.

(Continued)

*Primary Examiner* — Duc Doan
(74) *Attorney, Agent, or Firm* — Schwegman, Lundberg & Woessner, P.A.; Gregory J. Gorrie (57) ABSTRACT

An input-output memory management unit (IOMMU) and method for tracking memory pages during virtual-machine migration are generally described herein. The IOMMU includes an IOMMU manager to service address translation requests associated with memory pages received from a plurality of I/O devices, and a translation request filter to identify translations previously requested from a translation manager. The IOMMU also includes a device context table to identify whether virtual-machine migration is enabled for memory pages associated with virtual addresses identified in received address translation requests. Based on information in the device context table, the IOMMU manager may send a virtual page identifier to the translation manager identifying a virtual page when virtual-machine migration is enabled to indicate that the virtual page has been accessed. The IOMMU manager refrains from sending the virtual page identifier to the translation manager when the virtual page is listed in the translation request filter.

17 Claims, 3 Drawing Sheets

U.S. PATENT DOCUMENTS

2009/0119663 A1    5/2009    Mukherjee et al.

OTHER PUBLICATIONS

U.S. Appl. No. 11/933,790, Non-Final Office Action mailed Jul, 1, 2010, 18 pgs.

U.S. Appl. No. 11/933,790, Response filed Sep. 22, 2010 to Non Final Office Action mailed Jul. 1, 2010, 16 pgs.

International Application Serial No. PCT/US2009/039790, Search Report mailed Jun. 2, 2009, 4 pgs.

International Application Serial No. PCT/US2009/039790, Written Opinion mailed Jun. 2, 2009, 5 pgs.

* cited by examiner

INPUT-OUTPUT MEMORY MANAGEMENT UNIT (IOMMU) AND METHOD FOR TRACKING MEMORY PAGES DURING VIRTUAL-MACHINE MIGRATION

PRIORITY CLAIM

This application is a continuation of U.S. patent application Ser. No. 11/933,790, filed on Nov. 1, 2007, which is incorporated herein by reference in its entirety.

TECHNICAL FIELD

Some example embodiments pertain to processing systems. Some example embodiments pertain to memory management for input-output (I/O) devices. Some example embodiments pertain to live migration of virtual machines (VMs) and virtualization platforms.

BACKGROUND

Processing systems conventionally implement memory management functionality to translate addresses from a virtual address space used by each process and/or I/O device to a physical address that may span the actual system memory. This memory management functionality may include various memory protections (e.g., read only, read/write privileges, etc.) and may restrict access to certain pages of memory to particular processes or I/O devices. The use of these memory management techniques may help protect the main memory as well as improve system performance.

One issue with these memory management techniques is that translation requests received over an I/O bus that are not able to be serviced (i.e., missed requests) may cause requests for a particular I/O device to be serviced out-of-order. Another issue with these memory management techniques is that translation requests that are not able to be serviced may cause requests for other I/O devices to be delayed or blocked. Yet another issue with these memory management techniques is that during virtual machine migration, it may be difficult to track memory pages that were accessed by an I/O device between the initial and final copy phases.

OVERVIEW

In some example embodiments, an IOMMU provides virtual-to-physical address translations and includes one or more reorder buffers. Each reorder buffer may be associated with an I/O device to queue pending translation requests. The IOMMU may also include an IOMMU manager to service translation requests received from the I/O devices. The IOMMU manager may store a translation request received from a requesting I/O device in one of the reorder buffers associated with the requesting I/O device when the translation request is unable to be serviced or when there are one or more pending translation requests in the associated reorder buffer.

In some other example embodiments, a method for performing address translations in an IOMMU includes storing a translation request received from a requesting I/O device in a reorder buffer associated with the requesting I/O device when the translation request is unable to be serviced or when there are one or more pending translation requests in the reorder buffer. The method may also include refraining from servicing a translation request as long as a previously received translation request is pending in the reorder buffer associated with the requesting I/O device.

DESCRIPTION OF EXAMPLE EMBODIMENTS

The following description and the drawings sufficiently illustrate specific example embodiments to enable those skilled in the art to practice them. Other example embodiments may incorporate structural, logical, electrical, process, and other changes. Examples merely typify possible variations. Individual components and functions are optional unless explicitly required, and the sequence of operations may vary. Portions and features of some example embodiments may be included in, or substituted for those of other example embodiments. Example embodiments set forth in the claims encompass all available equivalents of those claims.

Figure 1:
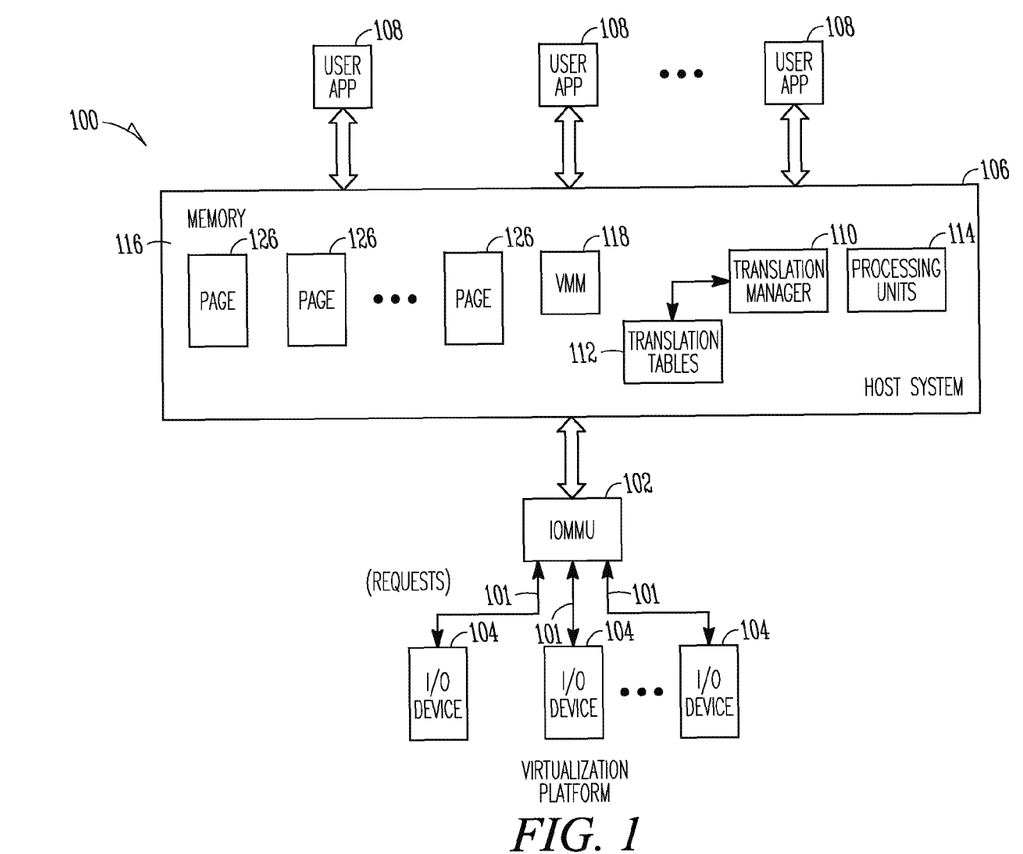
FIG. 1 is a block diagram of a virtualization platform in accordance with some example embodiments.

FIG. 1 is a block diagram of a virtualization platform in accordance with some example embodiments. Virtualization platform 100 includes IOMMU 102, one or more I/O devices 104, host system 106, and one or more user applications 108. Host system 106 may include one or more processing units 114, memory 116, and translation manager 110. Memory 116 may include a plurality of pages 126 each associated with physical address space of memory 116. Memory 116 may also include a portion for storing translation tables 112 which may be used by translation manager 110 for translating virtual memory addresses to physical memory addresses.

In some example embodiments, host system 106 may include virtual-machine manager (VMM) 118 which may help manage virtual machine migration (i.e., the live migration of a virtual machine between physical machines). In these example embodiments, any one or more of user applications 108 may be considered a virtual machine and accordingly VMM 118 may manage the live migration of a running virtual machine between physical machines (i.e., from host system 106 to another host system). In some example embodiments, VMM 118 may operate as a hypervisor.

IOMMU 102 services translation requests 101 received from I/O devices 104 by performing virtual-to-physical address translations. For example, a physical address may be returned to a requesting device in response to a virtual address identified in translation request 101. In some example embodiments, IOMMU 102 may service translation requests in the order in which they are received by pending any transactions when the translation request is unable to be serviced or when there are one or more pending translation requests. IOMMU 102 may service translation requests 101 for I/O devices 104 in the order in which they are received even for I/O devices 104 having a missed request (i.e., the translation is not readily available). A missed request of one I/O device will not cause the delaying or blocking of translation requests of other I/O devices 104. Example embodiments are described in more detail below.

In some example embodiments, IOMMU 102 may include one or more reorder buffers (reorder buffers). Each reorder buffer may be associated with one of I/O devices 104. Reorder buffers may be used to queue pending translation requests. A translation request 101 received from a requesting I/O device 104 may be added to the reorder buffer associated with the requesting device when the translation request is unable to be serviced or when there are one or more pending translation requests in the reorder buffer. IOMMU 102 may refrain from servicing a translation request 101 as long as a previously received translation request is pending in the reorder buffer associated with the requesting device. IOMMU 102 may retry any pending translation requests of a particular reorder buffer when a physical address is written to the particular reorder buffer by translation manager 110. These example embodiments are described in more detail below.

In accordance with some example embodiments, IOMMU 102 may also provide notification of any memory pages that were accessed by an I/O device 104 between initial and final copy phases of virtual machine migration that may be performed by VMM 118. These example embodiments are also described in more detail below.

In some example embodiments, virtualization platform 100 may be almost any processing system including a computer system or a server system. In some example embodiments, user applications 108 may be viewed as guest applications and may include an instance of a guest operating system. User applications 108 may also include un-privileged user-space applications, although the scope of the disclosure is not limited in this respect. In some example embodiments, I/O devices 104 may be any memory-mapped I/O device that uses virtual memory mapping and may include peripheral devices such as network cards, disk controllers and graphics cards, although the scope of the disclosure is not limited in this respect.

Although virtualization platform 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some example embodiments, the functional elements of virtualization platform 100 may refer to one or more processes operating on one or more processing units 114.

Figure 2:
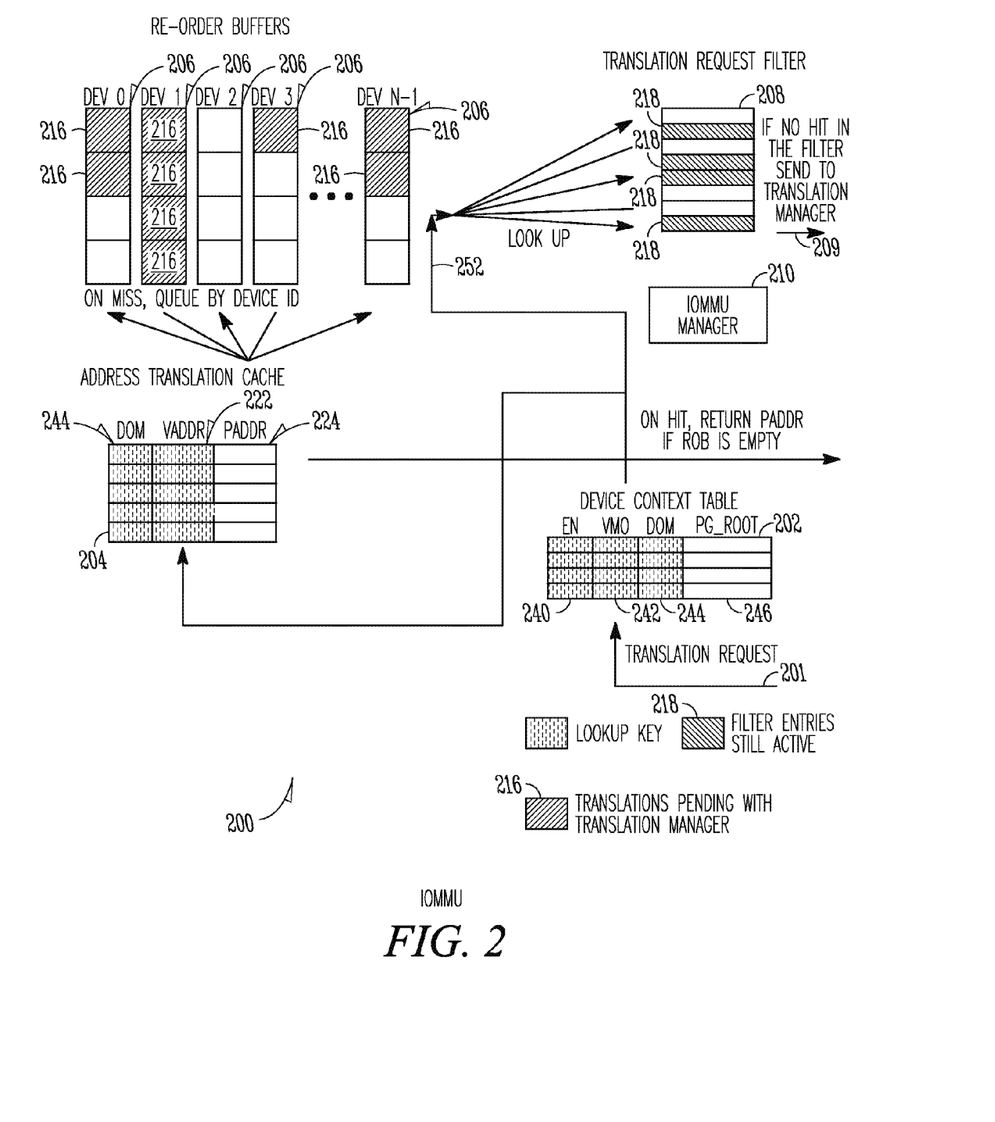
FIG. 2 is a functional block diagram of an I/O memory management unit (IOMMU) in accordance with some example embodiments.

FIG. 2 is a functional block diagram of an IOMMU in accordance with some example embodiments. IOMMU 200 may be suitable for use as IOMMU 102 (FIG. 1), although other configurations of an IOMMU may also be suitable. IOMMU 200 may provide virtual-to-physical address translations in response to translation requests 201 received from one or more of I/O devices 104 (FIG. 1). Translation request 201 may correspond to translation requests 101 (FIG. 1). IOMMU 200 may comprise one or more reorder buffers 206 to queue pending translation requests 216. Each reorder buffer 206 may be associated with one of I/O devices 104 (FIG. 1). IOMMU 200 may also include address translation cache (ATC) 204 to associate virtual addresses (VADDR) 222 with physical addresses (PADDR) 224 for address spaces 244 (e.g., domains (DOM)) for which address translation is enabled. IOMMU 200 may also comprise IOMMU manager 210 to manage the operations of IOMMU 200 in servicing translation requests 201 by providing a physical address in response to a virtual address, as discussed in more detail below. IOMMU 200 may also include device context table 202 and/or translation request filter 208 discussed in more detail below.

ATC 204 may associate virtual addresses 222 that may be received in translation request messages 201 with physical addresses 224 of memory 116 (FIG. 1). In response to a translation request 201 received from an I/O device (i.e., one of I/O devices 104 (FIG. 1)), IOMMU manager 210 may compare the virtual address 224 identified in the translation request 201 with entries (e.g., rows) of ATC 204 to determine a corresponding physical address 224. ATC 204 may include a state machine to select a row with multiple entries based on address space 244 (i.e., a domain), and may identify an entry from the selected row by performing a comparison with the virtual address.

Device context table 202 may store domain enable bit 240 associated with each address space 244 to indicate whether address translation is enabled for particular pages. IOMMU manager 210 may refrain from performing address translations when address translation is not enabled. IOMMU manager 210 may return the virtual address (instead of a physical address) to a requesting device (e.g., one of requesting devices 104 (FIG. 1)) when address translation is not enabled.

In some example embodiments, IOMMU manager 210 may store at least the virtual address of a translation request 201 received from a requesting device, such as one of requesting devices 104 (FIG. 1), in a reorder buffer 206 associated with the requesting I/O device when the translation request is unable to be serviced immediately (i.e., therefore needing offline serving). In addition, IOMMU manager 210 may store at least the virtual address of a translation request received from a requesting device in a reorder buffer 206 associated with the requesting device when there are one or more pending translation requests 216 in the associated reorder buffer 206. IOMMU manager 210 may also refrain from servicing a translation request 201 as long as a previously received and un-serviced translation request is pending in the reorder buffer 206 associated with the requesting device.

When a virtual address 222 identified in a translation request 201 is not associated with a physical address 224 in ATC 204, IOMMU manager 210 adds the virtual address 222 as a next entry in the reorder buffer 206 associated with the requesting I/O device. IOMMU manager 210 may retry pending translation requests of a particular reorder buffer 206 when a physical address is written to the particular reorder buffer by translation manager 110 (FIG. 1). In some example embodiments, the particular reorder buffer 206 may be instructed to retry by translation manager 110 (FIG. 1) and pending translation requests 216 in the reorder buffer 206 may then be serviced in a first-in first-out (FIFO) manner (i.e., the order they were received). In some example embodiments, IOMMU manager 210 may cause pending translation requests 216 to be serviced in each reorder buffer 206 by returning the physical address 224 stored within the associated reorder buffer 206 to the requesting I/O device.

In some example embodiments, when virtual address 222 identified in translation request 201 is not associated with physical address 224 in ATC 204, a 'miss' has occurred and IOMMU manager 210 may add the virtual address 222 as a pending request to a next entry in the reorder buffer 206 associated with the requesting I/O device. In some example embodiments, IOMMU manager 210 may identify the particular I/O device based on a device ID included within translation request 201. When a miss occurs and IOMMU manager 210 adds a virtual address to the associated reorder buffer 206, the virtual address stored in the reorder buffer 206 may be viewed as a pending translation request. A miss may occur because ATC 204 does not necessarily store all address translations that may be stored in translation tables 112 (FIG. 1), and/or a previously stored translation entry may have been evicted from ATC 204.

In some example embodiments, IOMMU 200 may use translation request filter 208 to identify translations already requested from translation manager 110 (FIG. 1). When a virtual address 222 identified in a translation request 201 is not associated with a physical address 224 in ATC 204, IOMMU manager 210 may send a translation request message 209 to translation manager 110 (FIG. 1) to request the physical address associated with the virtual address. In these example embodiments, IOMMU manager 210 may refrain from sending a translation request message 209 when a virtual page (Vpage) 218 associated with the virtual address is identified in translation request filter 208 (indicating that the translation had already been requested). Accordingly, the use of translation request filter 208 may help reduce the number of requests sent to translation manager 110 (FIG. 1) and may help prevent translation manager 110 (FIG. 1) from being exposed to requests for translations that may have already been requested. In some example embodiments, translation tables 112 (FIG. 1) may comprise an input-output translation lookaside buffer (IOTLB) which may be used by translation manager 110 (FIG. 1) to fill the entries of ATC 204.

In some example embodiments, when a translation request 201 is received from an I/O device having one or more pending translation requests 216 stored in an associated reorder buffer 206, IOMMU manager 210 may store at least the virtual address received in the translation request 201 in the associated reorder buffer 206 and may refrain from servicing the translation request 201 until the pending translation requests 216 are serviced. When a physical address corresponding to the virtual address received in the translation request 210 is available in ATC 204, IOMMU manager 210 may also store the physical address in the entry of the associated reorder buffer 206. In these example embodiments, for a translation request 201 received from an I/O device having one or more pending translation requests, IOMMU manager 210 stores the physical address as well as the virtual address in the associated reorder buffer 206 when the physical address was able to be determined from ATC 204. This allows pending translation requests to be serviced directly from the associated reorder buffer 206 in the order in which they are received without referral back to ATC 204. Accordingly, the use of reorder buffers 206 to queue pending translation requests for each I/O device 104 (FIG. 1) helps assure that translation requests 201 are processed in the order in which they are received. Furthermore, the use of reorder buffers 206 for each I/O device 104 (FIG. 1) helps assure that translation requests 201 from any particular I/O device are not blocked due to the pending translation requests of other I/O devices.

When a requested physical address is returned by translation manager 110 (FIG. 1) in response to a translation request message 209, IOMMU manager 210 may allow the returned physical address to be stored by translation manager 110 (FIG. 1) in an entry of the reorder buffer 206 associated with the requesting device 104 (FIG. 1) for the corresponding pending translation request. IOMMU manager 210 may then service, in a FIFO manner, any serviceable pending translation requests 216 stored in the reorder buffer (e.g., those having a physical address). Accordingly, as physical addresses for pending translation requests are written to a reorder buffer 206, pending translation requests may be serviced in a FIFO manner directly from the reorder buffer 206 without having to make a trip through ATC 204. When a physical address is returned and the translation request is serviced, the corresponding entry in the reorder buffer 206 may be cleared.

In some example embodiments, when a requested physical address is returned by translation manager 110 (FIG. 1) in response to translation request message 209, IOMMU manager 210 may also allow ATC 204 to be updated with the returned physical address. The returned physical address may be returned to ATC 204 for use in servicing subsequent translation requests within the same range. In some example embodiments, entries of ATC 204 may be updated in a least-recently-used (LRU) manner in which least-recently-used entries are replaced, although the scope of the disclosure is not limited in this respect.

In some example embodiments, ATC 204 may be updated directly by translation manager 110 (FIG. 1). In these example embodiments, when translation manager 110 (FIG. 1) believes that it has filled in an ATC entry, it may write to (i.e., ring a doorbell of) a reorder buffer 206 allowing pending translation requests of the associated I/O device to get run through ATC 204. The entries of the particular reorder buffer 206 may be processed until an entry is found which cannot be satisfied (i.e., a pending translation request 216 does not have a physical address associated with the virtual address).

In some example embodiments, IOMMU manager 210 may immediately return the physical address to the requesting I/O device when no translation requests are pending in the reorder buffer 206 associated with the requesting I/O device. When the virtual address 222 and the physical address 224 for an enabled domain (i.e., address space 244 indicated by domain enable bit 240) are identified in ATC 204, this may be termed a 'hit', allowing the corresponding physically address 224 to be returned.

Some example embodiments may be used to help facilitate the live migration of a running virtual machine from one physical host to another with almost zero downtime or interruption in service. An example of live migration includes Vmotion™ by VMware, although other live migration techniques may be used. In these example embodiments, user applications 108 (FIG. 1) may be virtual machines or guest applications that use a virtual addressing scheme (e.g., implemented by a hypervisor or VMM 118 (FIG. 1)) to allow a virtual machine to be transferred over a high speed network allowing the virtual machine to almost instantaneously switch from running on a source server (e.g., host system 106) to a destination server. In some example embodiments, the source and destination servers may be ESX, Xen and/or kernel-virtual machine (KVM) type servers, although the scope of the disclosure is not limited in this respect. During the migration, memory transactions are tracked and memory pages 126 (FIG. 1) and system state are copied to the destination server. Once the memory pages and system state are copied to the destination server, operations in the source server may be suspended and operations resume on the destination server.

In some example embodiments, device context table 202 may identify whether virtual-machine migration is enabled for pages 126 (FIG. 1) associated with virtual addresses 222 identified in received translation requests 201 through the use of live migration bit (vmo) bit 242. Live migration bit 242 for particular I/O devices may be indicated by page table root 246. In these example embodiments, IOMMU manager 210 may send virtual page identifier 252 to translation manager 110 (FIG. 1) identifying the virtual page when virtual-machine migration is enabled to indicate that a virtual page has been either written to or read from (i.e., has being touched). IOMMU manager 210 may refrain from sending virtual page identifier 252 to translation manager 110 (FIG. 1) when the virtual page 218 is already listed in translation request filter 208 as having a pending request with translation manager 110 (FIG. 1). In some example embodiments, a lookup in table 208 may be performed using the domain (i.e., address space 244) and virtual page 218 identified in virtual page identifier 252.

As discussed above, virtual pages 218 that are accessed by an I/O device and are associated with a virtual machine undergoing live migration may be listed in the translation request filter 208. When virtual-machine migration is enabled, a virtual machine (e.g., one of user applications 108 (FIG. 1)) may be in the process of being transferred from host system 106 (FIG. 1) to another host system. Pages 126 (FIG. 1) in main memory 116 (FIG. 1) that are accessed by the virtual machine may be identified in translation request filter 208. In this way, translation request filter 208 may be used to track pages 126 (FIG. 1) that are accessed between an initial copy phase and a final copy phase of the virtual-machine migration process. This allows accessed pages to be identified a single time to translation manager 110 (FIG. 1), rather than every time a page is accessed. Translation manager 110 (FIG. 1) may be responsible for compiling a list all pages that get accessed while live migration bit 242 in device context table 202 is set.

At the onset of virtual machine migration, an initial copy of the virtual machine's pages is made, I/O operations and other functions are allowed to complete, and a final copy of the pages that had been accessed since the initial copy is made. In some high-availability example embodiments, the initial copy may be made at the onset of virtual machine migration and snapshots of the pages may be taken throughout the migration process.

In some example embodiments, when a translation request 201 received from an I/O device includes a flush token in place of a virtual address, IOMMU manager 210 may add the flush token to a last entry of the reorder buffer 206 associated with the requesting I/O device when there are one or more pending translation requests 216. IOMMU manager 210 may run through the entries of the reorder buffer, and when the flush token makes its way to the head or top of the reorder buffer 206 (i.e., no more pending translation exist ahead of it), the associated I/O device may be considered flushed. A flush indicator may then be sent to translation manager 110 (FIG. 1) to indicate that the associated I/O device may be considered flushed. This allows translation manager 110 (FIG. 1) to safely conclude that there are no more lingering translation requests for the associated I/O device. Entries in ATC 204 for the flushed I/O device may be removed. In some example embodiments, the flush indicator may be a translation request message 209 with a flush bit set.

Figure 3:
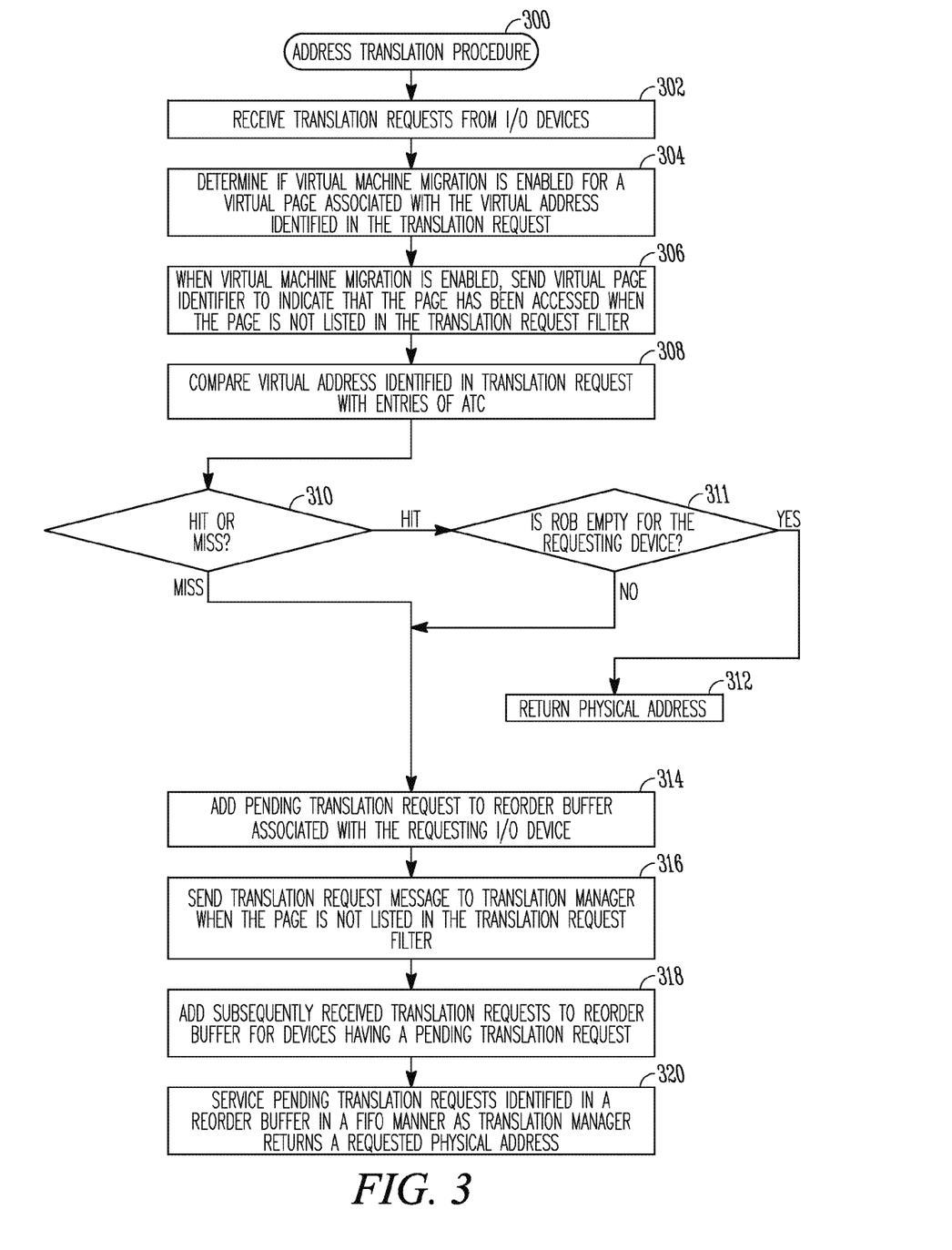
FIG. 3 is a flow chart of an address translation procedure in accordance with some example embodiments.

FIG. 3 is a flow chart of an address translation procedure in accordance with some example embodiments. Address translation procedure 300 may be used to translate virtual-to-physical addresses for requesting I/O devices. In some example embodiments, procedure 300 may be performed by an IOMMU, such as IOMMU 102 (FIG. 1) or IOMMU 200 (FIG. 2), although other IOMMU configurations may also be used.

In operation 302, translation requests, such as translation requests 201 (FIG. 2), are received from I/O devices, such as I/O devices 104 (FIG. 1). Each translation request may identify at least the particular requesting I/O device and a virtual address.

Operation 304 determines if virtual machine migration is enabled for a virtual page associated with the virtual address identified in the translation request. In some example embodiments, operation 304 may use device context table 202 (FIG. 2) to determine whether virtual machine migration is enabled. When virtual machine migration is enabled, operation 306 sends a virtual page identifier to translation manager 110 (FIG. 1) to indicate that the page has been accessed when the page is not listed in translation request filter 208 (FIG. 2).

In operation 306, the virtual address received in the translation request is compared with entries of ATC 204 to determine whether or not a corresponding physical address is available. When the corresponding physical address is available (i.e., a hit), operation 311 may be performed. When the corresponding physical address is not available in ATC 204 (i.e., a miss), operation 314 may be performed.

Operation 310 determines if the reorder buffer (ROB) for the requesting device is empty (e.g., no pending translation requests 216 exist for the requesting device). If the reorder buffer is empty, operation 312 is performed and the physical address from ATC 204 may be returned to the requesting I/O device when ACT 204 has the translation. If the reorder buffer is not empty, operation 314 may be performed.

In operation 314, the pending translation request is added to the reorder buffer associated with the requesting I/O device. The physical address identified in ATC 204 may be included in the entry when the result of operation 310 was a hit.

In operation 316, a translation request message, such as translation request message 209 (FIG. 2), is sent to translation manager 110 (FIG. 1) when the page associated with the virtual address is not already listed in translation request filter 208.

In operation 318, any subsequently received translation requests are added to reorder buffer for I/O devices having one or more pending translation request.

In operation 320, pending translation requests identified in a reorder buffer are serviced in a FIFO manner when a physical address returned by translation manager 110 is written to the reorder buffer. In these example embodiments, when translation manager 110 (FIG. 1) believes that it has filled in an ATC entry, it may write to (i.e., ring a doorbell of) the associated reorder buffer allowing pending translation requests of the associated I/O device to get run through ATC 204 (FIG. 2). The entries of the associated reorder buffer may be processed until an entry is found which cannot be satisfied (e.g., a pending translation request 216 (FIG. 2) does not have a physical address associated with the virtual address).

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Example embodiments may be implemented in one or a combination of hardware, firmware, and software. Example embodiments may also be implemented as instructions stored on a machine-readable medium, which may be read and executed by at least one processor to perform the operations described herein. A machine-readable medium may include any non-transitory mechanism for storing information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An input-output memory management unit (IOMMU) configured for tracking memory pages during virtual-machine migration comprising a live migration of a virtual machine from a source server to a destination server, the IOMMU comprising:
    an IOMMU manager to service address translation requests associated with memory pages received from a plurality of I/O devices;
    a translation request filter to identify translations previously requested from a translation manager; and
    a device context table to identify whether virtual-machine migration is enabled for memory pages associated with virtual addresses identified in received address translation requests,
    wherein based on information in the device context table, the IOMMU manager is configured to send a virtual page identifier to the translation manager identifying a virtual page when virtual-machine migration is enabled to indicate that the virtual page has been accessed,
    wherein the IOMMU manager refrains from sending the virtual page identifier to the translation manager when the virtual page is listed in the translation request filter,
    wherein during the virtual-machine migration, a virtual machine manager (VMM) tracks memory transactions and copies memory pages and system state to the destination server and once the memory pages and system state are copied to the destination server operations in the source server are suspended and operations resume on the destination server, and
    wherein during the virtual-machine migration, the IOMMU is configured to provide notification to the translation manager of any memory pages that were accessed by an I/O device between initial and final copy phases of the virtual-machine migration for tracking by the translation request filter.

2. The IOMMU of claim 1 wherein during virtual-machine migration, memory pages and system state are copied from the source server to the destination server, and
    wherein after virtual-machine migration, operations on the source server are suspended and operations resume on the destination server.

3. An input-output memory management unit (IOMMU) configured for tracking memory pages during virtual-machine migration, the IOMMU comprising:
    an IOMMU manager to service address translation requests associated with memory pages received from a plurality of I/O devices;
    a translation request filter to identify translations previously requested from a translation manager;
    a device context table to identify whether virtual-machine migration is enabled for memory pages associated with virtual addresses identified in received address translation requests; and
    one or more reorder buffers, each reorder buffer associated with one of the I/O devices to queue the pending address translation requests,
    wherein based on information in the device context table, the IOMMU manager is configured to send a virtual page identifier to the translation manager identifying a virtual page when virtual-machine migration is enabled to indicate that the virtual page has been accessed,
    wherein the IOMMU manager refrains from sending the virtual page identifier to the translation manager when the virtual page is listed in the translation request filter, and
    wherein the IOMMU manager is configured to service, in a first-in first-out manner, pending address translation requests having a physical address stored in the associated reorder buffer when a physical address is written to the associated reorder buffer by causing the IOMMU to return a physical address to a requesting I/O device so that address translation requests for each I/O device are serviced in an order in which they are received.

4. The IOMMU of claim 3 wherein the IOMMU manager is configured to store an address translation request received from a requesting I/O device in one of the reorder buffers associated with the requesting I/O device when the address translation request is unable to be serviced or when there are one or more pending address translation requests in the associated reorder buffer.

5. The IOMMU of claim 3 wherein the IOMMU manager is configured to refrain from servicing an address translation request as long as a previously received address translation request is pending in the reorder buffer associated with the requesting I/O device, and
    wherein when a virtual address identified in the address translation request is not associated with a physical address in an address translation cache (ATC), the IOMMU manager is configured to send a translation request message to the translation manager to request the physical address associated with the virtual address.

6. The IOMMU of claim 3 wherein the virtual-machine migration comprises a live migration of a virtual machine from a source server to a destination server,
    wherein during the virtual-machine migration, a virtual machine manager (VMM) tracks memory transactions and copies memory pages and system state to the destination server,
    wherein once the memory pages and system state are copied to the destination server, operations in the source server are suspended and operations resume on the destination server, and
    wherein during the virtual-machine migration, the IOMMU is configured to provide notification of any memory pages that were accessed by an I/O device between initial and final copy phases of the virtual-machine migration.

7. A method for tracking memory pages during virtual-machine migration comprising a live migration of a virtual machine from a source server to a destination server, the method comprising:
    servicing, with an IOMMU manager, address translation requests associated with memory pages received from a plurality of I/O devices;
    identifying, with a translation request filter, translations previously requested from a translation manager;
    identifying, with a device context table, whether virtual-machine migration is enabled for memory pages associated with virtual addresses identified in received address translation requests;

sending, based on information in the device context table, a virtual page identifier to the translation manager identifying a virtual page when virtual-machine migration is enabled to indicate that the virtual page has been accessed; and refraining from sending the virtual page identifier to the translation manager when the virtual page is listed in the translation request filter, wherein during the virtual-machine migration, the method includes:

tracking memory transactions and copying memory pages and system state to the destination server;

once the memory pages and system state are copied to the destination server, suspending operations in the source server and resuming operations on the destination server, and providing notification to the translation manager of any memory pages that were accessed by an I/O device between initial and final copy phases of the virtual-machine migration for tracking by the translation request filter.

8. The method of claim 7 wherein during virtual-machine migration, memory pages and system state are copied from the source server to the destination server, and wherein after virtual-machine migration, operations on the source server are suspended and operations resume on the destination server.

9. A method for tracking memory pages during virtual-machine migration comprising:

servicing, with an IOMMU manager, address translation requests associated with memory pages received from a plurality of I/O devices;

identifying, with a translation request filter, translations previously requested from a translation manager;

identifying, with a device context table, whether virtual-machine migration is enabled for memory pages associated with virtual addresses identified in received address translation requests;

sending, based on information in the device context table, a virtual page identifier to the translation manager identifying a virtual page when virtual-machine migration is enabled to indicate that the virtual page has been accessed;

refraining from sending the virtual page identifier to the translation manager when the virtual page is listed in the translation request filter;

queuing pending address translation requests in one or more reorder buffers, each reorder buffer associated with one of the I/O devices; and servicing in a first-in first-out manner, pending address translation requests having a physical address stored in the associated reorder buffer when a physical address is written to the associated reorder buffer by causing the IOMMU to return a physical address to a requesting I/O device so that address translation requests for each I/O device are serviced in an order in which they are received.

10. The method of claim 9 further comprising storing an address translation request received from a requesting I/O device in one of the reorder buffers associated with the requesting I/O device when the address translation request is unable to be serviced or when there are one or more pending address translation requests in the associated reorder buffer.

11. The method of claim 9 further comprising:

refraining from servicing an address translation request as long as a previously received address translation request is pending in the reorder buffer associated with the requesting I/O device; and sending, when a virtual address identified in the address translation request is not associated with a physical address in an address translation cache (ATC), a translation request message to the translation manager to request the physical address associated with the virtual address.

12. The method of claim 9 wherein the virtual-machine migration comprises a live migration of a virtual machine from a source server to a destination server, wherein during the virtual-machine migration, a virtual machine manager (VMM) tracks memory transactions and copies memory pages and system state to the destination server, wherein once the memory pages and system state are copied to the destination server, operations in the source server are suspended and operations resume on the destination server, and wherein during the virtual-machine migration, the method comprises providing notification of any memory pages that were accessed by an I/O device between initial and final copy phases of the virtual-machine migration.

13. A virtualization platform comprising:

a host system; and an input-output memory management unit (IOMMU) configured for tracking memory pages of the host system during virtual-machine migration of the host system, wherein the IOMMU comprises:

an IOMMU manager to service address translation requests associated with the memory pages received from a plurality of I/O devices;

a translation request filter to identify translations previously requested from a translation manager; and a device context table to identify whether virtual-machine migration is enabled for memory pages associated with virtual addresses identified in received address translation requests, wherein based on information in the device context table, the IOMMU manager is configured to send a virtual page identifier to the translation manager identifying a virtual page when virtual-machine migration is enabled to indicate that the virtual page has been accessed, and wherein the IOMMU manager is configured to service, in a first-in first-out manner, pending address translation requests having a physical address stored in an associated reorder buffer when a physical address is written to the associated reorder buffer by causing the IOMMU to return a physical address to a requesting I/O device so that address translation requests for each I/O device are serviced in an order in which they are received.

14. The virtualization platform of claim 13 wherein the IOMMU further comprises one or more of the associated reorder buffers, each reorder buffer associated with one of the I/O devices to queue the pending address translation requests.

15. The virtualization platform of claim 14 wherein the IOMMU manager refrains from sending the virtual page identifier to the translation manager when the virtual page is listed in the translation request filter.

16. A non-transitory computer-readable storage medium that stores instructions for execution by one or more processors for tracking memory pages during virtual-machine migration comprising a live migration of a virtual machine from a source server to a destination server, wherein the one or more processors are configured by the instructions to:

service, with an IOMMU manager, address translation requests associated with memory pages received from a plurality of I/O devices;

identify, with a translation request filter, translations previously requested from a translation manager;

identify, with a device context table, whether virtual-machine migration is enabled for memory pages associated with virtual addresses identified in received address translation requests;

send, based on information in the device context table, a virtual page identifier to the translation manager identifying a virtual page when virtual-machine migration is enabled to indicate that the virtual page has been accessed; and refrain from sending the virtual page identifier to the translation manager when the virtual page is listed in the translation request filter.

17. The non-transitory computer-readable storage medium of claim 16 wherein during virtual-machine migration, memory pages and system state are copied from the source server to the destination server, and wherein after virtual-machine migration, operations on the source server are suspended and operations resume on the destination server.

* * * * *